US012675190B2

(12) United States Patent　　(10) Patent No.: US 12,675,190 B2
Park et al.　　(45) Date of Patent: Jul. 7, 2026

(54) TOUCH SENSOR APPARATUS, DISPLAY APPARATUS INCLUDING THE SAME AND METHOD OF DRIVING TOUCH SENSOR USING THE SAME

(71) Applicant: SAMSUNG DISPLAY CO., LTD., Yongin-si (KR)

(72) Inventors: Sanghun Park, Yongin-si (KR); Jaseung Ku, Yongin-si (KR); Jinwoo Kim, Yongin-si (KR); Bo-Hwan Lee, Yongin-si (KR); Sanghyun Lim, Yongin-si (KR); Byeongkyu Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/742,275

(22) Filed: Jun. 13, 2024

(65) Prior Publication Data

US 2025/0085808 A1　Mar. 13, 2025

(30) Foreign Application Priority Data

Sep. 12, 2023　(KR) ........................ 10-2023-0121282

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/044* (2013.01)

(58) Field of Classification Search
CPC .... G06F 3/0446; G06F 3/0443; G06F 3/0418; G06F 3/0412; G06F 3/04166; G06F 3/044
See application file for complete search history.

(56) References Cited

U.S. PATENT DOCUMENTS

2023/0074418 A1 * 3/2023 Chen ..................... G09G 3/3655

FOREIGN PATENT DOCUMENTS

KR　10-2012-0078072　7/2012

* cited by examiner

*Primary Examiner* — Yaron Cohen
(74) *Attorney, Agent, or Firm* — F. CHAU & ASSOCIATES, LLC

(57) ABSTRACT

A touch sensor apparatus includes a touch sensor and a transistor. The transistor is connected to the touch sensor. The transistor includes a first electrode configured to receive a first touch driving signal, a control electrode configured to receive a second touch driving signal and a second electrode connected to the touch sensor. A phase of the first touch driving signal is substantially the same as a phase of the second touch driving signal.

20 Claims, 16 Drawing Sheets

710

720

TOUCH SENSOR APPARATUS, DISPLAY APPARATUS INCLUDING THE SAME AND METHOD OF DRIVING TOUCH SENSOR USING THE SAME

CROSS-REFERENCE TO RELATED APPLICATION

This patent application claims priority under 35 U.S.C. § 119 to Korean Patent Application No. 10-2023-0121282, filed on Sep. 12, 2023 in the Korean Intellectual Property Office (KIPO), the disclosure of which is incorporated by reference in its entirety herein.

1. Technical Field

Embodiments of the present inventive concept are directed to a touch sensor apparatus, a display apparatus including the touch sensor apparatus and a method of driving a touch sensor using the touch sensor apparatus. More particularly, embodiments of the present inventive concept relate to a touch sensor apparatus capable of reducing electromagnetic interference (EMI).

2. Discussion of Related Art

A display apparatus may include a display panel and a panel driver for driving the display panel. The display panel displays an image based on input image data. The display panel includes a plurality of gate lines, a plurality of data lines and a plurality of pixels. The panel driver includes a gate driver, a data driver and a driving controller. The gate driver outputs gate signals to the gate lines. The data driver outputs data voltages to the data lines. The driving controller controls the gate driver and the data driver.

The display apparatus may include a touch sensor apparatus. The touch sensor apparatus may include a touch sensor and a touch driver for driving the touch sensor. For example, the touch driver may apply driving signal to the touch sensor.

However, display quality of the display panel may deteriorate or electromagnetic interference (EMI) may be generated in adjacent electronic devices when touch sensor driving signal becomes distorted. Further, when the display apparatus is used within a vehicle, the EMI may affect an operation of the vehicle and cause safety problems.

SUMMARY

At least one embodiment of the present inventive concept provides a touch sensor apparatus capable of reducing electromagnetic interference (EMI) by generating a first touch driving signal applied to a first electrode of a transistor connected to a touch sensor and a second touch driving signal applied to a control electrode of the transistor such that the first touch driving signal and the second touch driving signal have the same phase.

At least one embodiment of the present inventive concept provides a display apparatus including the touch sensor apparatus.

At least one embodiment of the present inventive concept provides a method of driving a touch sensor using the touch sensor apparatus.

In an embodiment of a touch sensor apparatus according to the present inventive concept, the touch sensor apparatus includes a touch sensor and a transistor. The transistor is connected to the touch sensor. The transistor includes a first electrode configured to receive a first touch driving signal, a control electrode configured to receive a second touch driving signal and a second electrode connected to the touch sensor. A phase of the first touch driving signal is substantially the same as a phase of the second touch driving signal.

In an embodiment, an average voltage of the first touch driving signal may be different from an average voltage of the second touch driving signal.

In an embodiment, the first touch driving signal may include a sine wave. The second touch driving signal may include a sine wave.

In an embodiment, the first touch driving signal may include a square wave. The second touch driving signal may include a square wave.

In an embodiment, when the transistor is a p-type transistor, the average voltage of the first touch driving signal may be greater than the average voltage of the second touch driving signal.

In an embodiment, when the transistor is an n-type transistor, the average voltage of the first touch driving signal may be less than the average voltage of the second touch driving signal.

In an embodiment, the touch sensor apparatus may include a first digital to analog converter configured to generate the first touch driving signal and a second digital to analog converter configured to generate the second touch driving signal.

In an embodiment, the first digital to analog converter may include a first power voltage terminal configured to receive a first power voltage, a second power voltage terminal configured to receive a second power voltage, a plurality of first resistors connected between the first power voltage terminal and the second power voltage terminal and a plurality of first switches connected to the first power voltage terminal, the second power voltage terminal and nodes between the first resistors. The second digital to analog converter may include a third power voltage terminal configured to receive a third power voltage, a fourth power voltage terminal configured to receive a fourth power voltage, a plurality of second resistors connected between the third power voltage terminal and the fourth power voltage terminal and a plurality of second switches connected to the third power voltage terminal, the fourth power voltage terminal and nodes between the second resistors.

In an embodiment, the first power voltage may be different from the third power voltage. The second power voltage may be different from the fourth power voltage.

In an embodiment, the touch sensor apparatus may further include a digital to analog converter configured to generate the first touch driving signal and a level shifter configured to generate the second touch driving signal.

In an embodiment, the digital to analog converter may include a first power voltage terminal configured to receive a first power voltage, a second power voltage terminal configured to receive a second power voltage, a plurality of first resistors connected between the first power voltage terminal and the second power voltage terminal and a plurality of first switches connected to the first power voltage terminal, the second power voltage terminal and nodes between the first resistors.

In an embodiment, the level shifter may be configured to receive the first touch driving signal output from the digital analog converter and shift a level of the first touch driving signal to generate the second touch driving signal.

In an embodiment, the touch sensor apparatus may further include a touch driver. The touch driver may include a driving circuit configured to apply the first touch driving signal and the second touch driving signal to the transistor and a sensing circuit configured to receive a sensed voltage from the transistor.

In an embodiment, the sensing circuit may include an amplifier including a first input terminal configured to receive a reference voltage, a second input terminal and an output terminal, a resistor connected between the second input terminal and the output terminal, a switch connected between the second input terminal and the output terminal and a capacitor connected between the second input terminal and the output terminal.

In an embodiment, the touch sensor apparatus may include first to eighth touch sensors and first to eighth transistors connected to a corresponding one of the first to eighth touch sensors. A first group driving signal may be configured to be applied to a control electrode of the first transistor and a control electrode of the fifth transistor. A second group driving signal may be configured to be applied to a control electrode of the second transistor and a control electrode of the sixth transistor. A third group driving signal may be configured to be applied to a control electrode of the third transistor and a control electrode of the seventh transistor. A fourth group driving signal may be configured to be applied to a control electrode of the fourth transistor and a control electrode of the eighth transistor.

In an embodiment, the first group driving signal may have an active waveform, the second group driving signal, the third group driving signal and the fourth group driving signal may have an inactive level during a first period. The second group driving signal may have an active waveform, the first group driving signal, the third group driving signal and the fourth group driving signal may have an inactive level during a second period. The third group driving signal may have an active waveform, the first group driving signal, the second group driving signal and the fourth group driving signal may have an inactive level during a third period. The fourth group driving signal may have an active waveform, the first group driving signal, the second group driving signal and the third group driving signal may have an inactive level during a fourth period.

In an embodiment of a display apparatus according to the present inventive concept, the display apparatus includes a display panel, a display panel driver, a touch sensor and a transistor. The display panel includes a pixel. The display panel driver is configured to drive the display panel. The transistor is connected to the touch sensor. The transistor includes a first electrode configured to receive a first touch driving signal, a control electrode configured to receive a second touch driving signal and a second electrode connected to the touch sensor. A phase of the first touch driving signal is substantially the same as a phase of the second touch driving signal.

In an embodiment, the transistor connected to the touch sensor may be disposed in a peripheral region of the display panel.

In an embodiment, an average voltage of the first touch driving signal may be different from an average voltage of the second touch driving signal.

In an embodiment of a method of driving a touch sensor according to the present inventive concept, the method includes applying a first touch driving signal to a first electrode of a transistor including a second electrode connected to the touch sensor, applying a second touch driving signal to a control electrode of the transistor and receiving a sensed voltage of the touch sensor through the transistor. A phase of the first touch driving signal is substantially the same as a phase of the second touch driving signal.

In an embodiment, an average voltage of the first touch driving signal may be different from an average voltage of the second touch driving signal.

According to the touch sensor apparatus, the display apparatus and the method of driving the touch sensor, the first touch driving signal applied to the first electrode of the transistor, which is connected to the touch sensor, and the second touch driving signal applied to the control electrode of the transistor may be generated to have the same phase so that EMI may be reduced.

Accordingly, the display quality of the display panel may be enhanced and an influence of the EMI on the touch sensor apparatus and electronic devices adjacent to the touch sensor apparatus may be reduced. In particular, when the display apparatus is used in a horizontally long display such as for a vehicle, the safety of the vehicle may be enhanced by reducing the EMI.

BRIEF DESCRIPTION OF THE DRAWINGS

The above and other features of the present inventive concept will become more apparent by describing in detailed embodiments thereof with reference to the accompanying drawings, in which.

DETAILED DESCRIPTION

Hereinafter, the present inventive concept will be explained in detail with reference to the accompanying drawings.

Figure 1A:
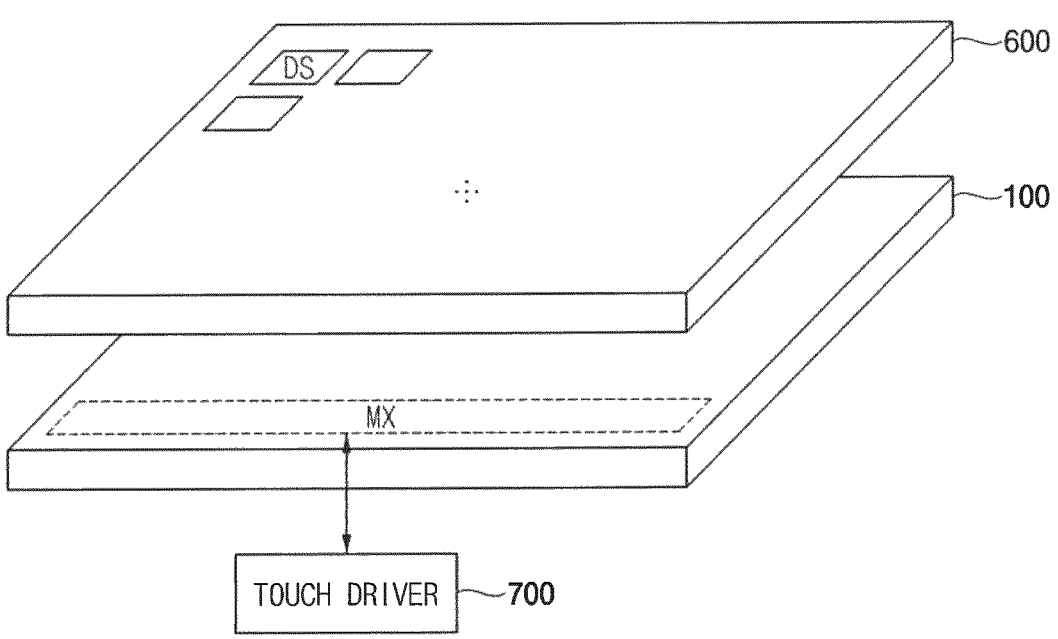
FIG. 1A is a block diagram illustrating a display apparatus according to an embodiment of the present inventive concept.
Figure 1B:
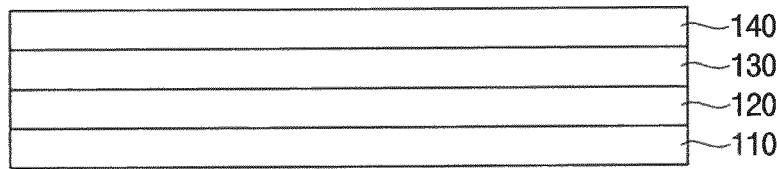
FIG. 1B is a conceptual cross-sectional view illustrating a display panel of the display apparatus according to an embodiment of the present inventive concept.
Figure 1C:
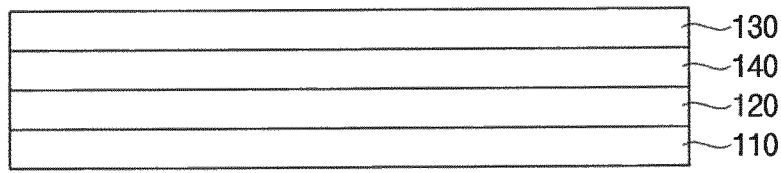
FIG. 1C is a conceptual cross-sectional view illustrating the display panel according to an embodiment of the present inventive concept.
Figure 2:
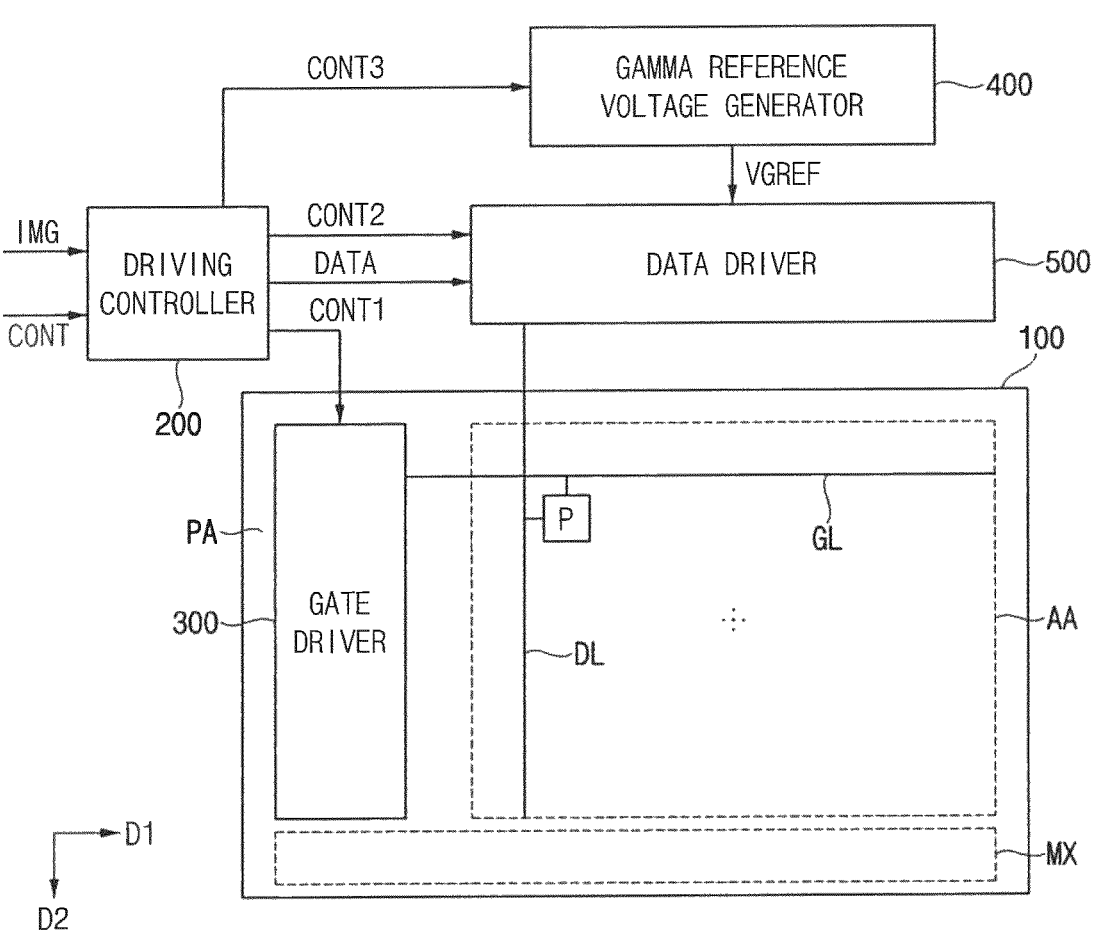
FIG. 2 is a block diagram illustrating a display panel, a driving controller, a gate driver, a gamma reference voltage generator, a data driver and a multiplexer of the display apparatus of FIG. 1A according to an embodiment of the present inventive concept.

FIG. 1A is a block diagram illustrating a display apparatus according to an embodiment of the present inventive concept. FIG. 1B is a conceptual cross-sectional view illustrating a display panel of the display apparatus according to an embodiment of the present inventive concept. FIG. 1C is a conceptual cross-sectional view illustrating the display panel according to an embodiment of the present inventive concept. FIG. 2 is a block diagram illustrating a display panel, a driving controller, a gate driver, a gamma reference voltage generator, a data driver and a multiplexer of the display apparatus of the display apparatus of FIG. 1A according to an embodiment of the present inventive concept.

Referring to FIGS. 1A to 2, the display apparatus includes a display panel 100, a display panel driver driving the display panel 100, a touch panel 600 disposed on the display panel 100 and a touch driver 700 (e.g., a driver circuit) driving the touch panel 600.

The touch panel 600 includes at least one touch sensor DS. For example, the touch sensor DS may be a self dot sensor. When the self dot sensor is used as the touch sensor DS, a panel bandwidth may be wide and an influence of noise on the display panel 100 may be reduced. It may be useful to use self dot sensors in a display apparatus of an automobile that has a long resolution in one direction since self dot sensors may be arranged more easily in a line form. However, when the touch sensor DS is implemented in the line form, signal delay may increase, the panel bandwidth may not be wide and noise influence on the display panel 100 may increase.

In FIG. 1A, the touch panel 600 may be disposed outside of the display panel 100. Alternatively, the touch panel 600 and the display panel 100 may be integrally formed. For example, when integrally formed, a single layer may be used to implement both the touch panel 600 and the display panel 100.

Referring to FIG. 1B, the display panel 100 may include a base substrate 110, a display layer 120 disposed on the base substrate 110, an encapsulation layer 130 disposed on the display layer 120 and a touch layer 140 disposed on the encapsulation layer 130. The display layer 120 may include a light emitting element. The touch layer 140 may include at least one touch sensor DS.

Referring to FIG. 1C, the display panel 100 may include a base substrate 110, a display layer 120 disposed on the base substrate 110, a touch layer 140 disposed on the display layer 120 and an encapsulation layer 130 disposed on the touch layer 140. The display layer 120 may include a light emitting element. The touch layer 140 may include a touch sensor DS.

Referring to FIG. 1A, a plurality of touch sensors DS may be connected to a multiplexer MX. The multiplexer MX may select a specific touch sensor DS at a specific time to drive the touch sensors DS in a time division driving method. The multiplexer MX may include a plurality of transistors connected to the plurality of touch sensors DS.

For example, the multiplexer MX (see FIG. 1A) may be disposed in a peripheral region PA (see FIG. 2) of the display panel 100. For example, the transistors of the multiplexer MX may be disposed in the peripheral region PA of the display panel 100. For example, the transistors may be integrated on the peripheral region PA of the display panel 100. It may be easier to mount pads when the transistors are integrated on the peripheral region PA of the display panel 100.

The touch driver 700 may apply a touch driving signal to the transistor. The touch driver 700 may receive a sensed voltage of the touch sensor DS through the transistor.

Referring to FIG. 2, the display panel driver may include a driving controller 200 (e.g., a controller circuit), a gate driver 300 (e.g., a first driver circuit), a gamma reference voltage generator 400 and a data driver 500 (e.g., a second driver circuit).

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be referred to as a timing controller embedded data driver (TED).

The display panel 100 has a display region AA on which an image is displayed and the peripheral region PA adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the gate lines GL may be disposed to be spaced apart from each other in a second direction D2 crossing the first direction D1. The data lines DL may extend in the second direction D2 and the data lines DL may be disposed to be spaced apart from each other in the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 3:
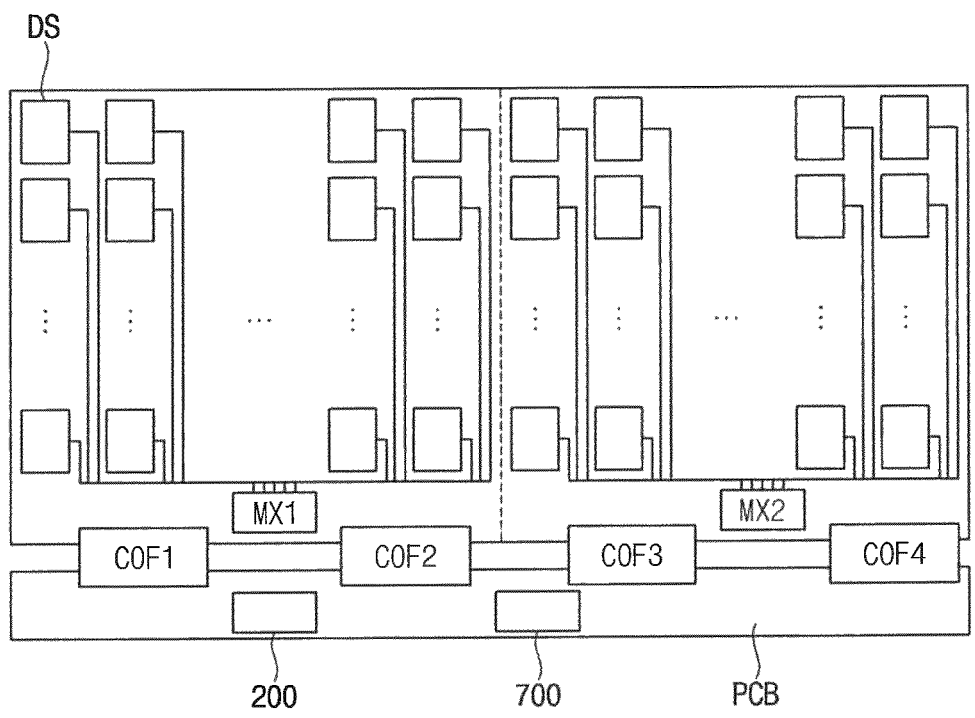
FIG. 3 is a conceptual diagram illustrating the display apparatus of FIG. 1A according to an embodiment of the present inventive concept.

FIG. 3 is a conceptual diagram illustrating the display apparatus of FIG. 1A according to an embodiment.

Referring to FIGS. 1A to 3, a first group of touch sensors DS in the touch panel 600 may be connected to a first multiplexer MX1 and a second group of touch sensors DS in the touch panel 600 may be connected to a second multiplexer MX2. For example, the first group of touch sensors DS may include one or more columns of first touch sensors and the second group of touch sensors DS may include one or more columns of second touch sensors.

The driving controller 200 and the touch driver 700 may be disposed on a printed circuit board PCB.

The touch driver 700 may be connected to the first multiplexer MX1 and the second multiplexer MX2, output the touch driving signal to the touch sensors DS and receive the sensed voltage from the touch sensors DS. Although the touch driver 700 includes two multiplexers MX1 and MX2 in FIG. 3, the present inventive concept is not limited to this number of multiplexers.

As shown in FIG. 3, the data driver 500 may be formed as a chip on film form. For example, a first chip on film unit COF1 may output a data voltage to a first area of the display panel 100, a second chip on film unit COF2 may output a data voltage to a second area of the display panel 100, a third chip on film unit COF3 may output a data voltage to a third area of the display panel 100 and a fourth chip on film unit COF4 may output a data voltage to a fourth area of the display panel 100. While four chip on film units are illustrated, present inventive concept is not limited to this number of chip on film units.

Figure 4:
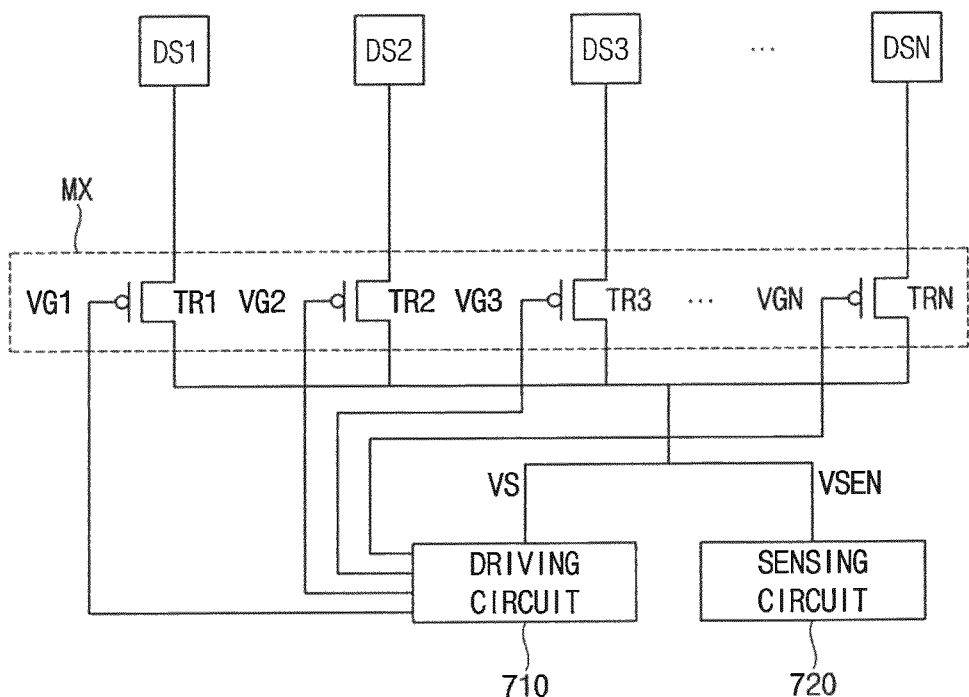
FIG. 4 is a circuit diagram illustrating a touch sensor apparatus of FIG. 1A according to an embodiment of the present inventive concept.
Figure 5:
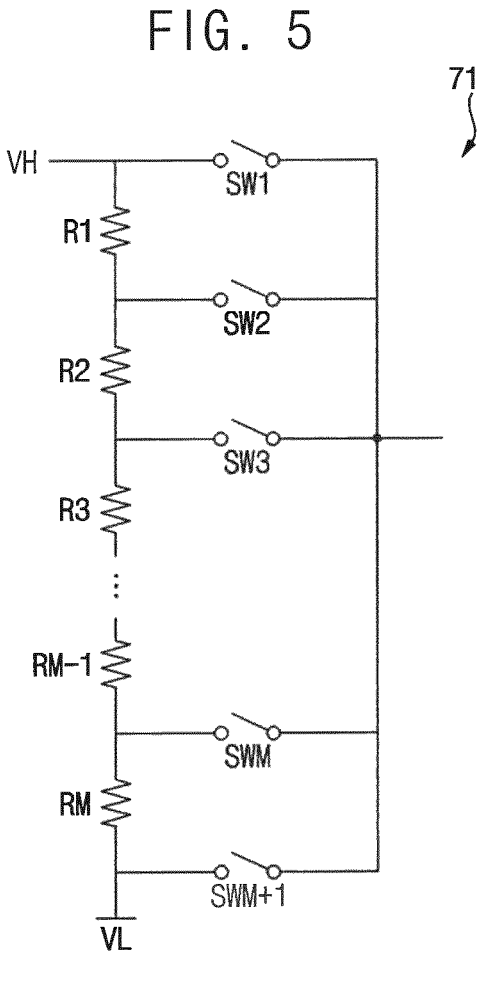
FIG. 5 is a circuit diagram illustrating a driving circuit of FIG. 4 according to an embodiment of the present inventive concept.
Figure 6:
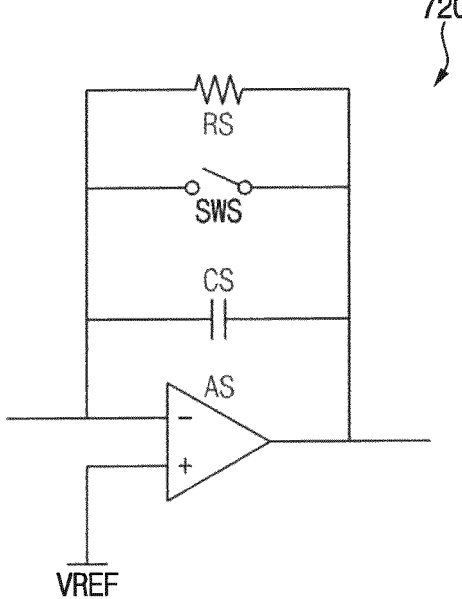
FIG. 6 is a circuit diagram illustrating a sensing circuit of FIG. 4 according to an embodiment of the present inventive concept.

FIG. 4 is a circuit diagram illustrating a touch sensor apparatus of FIG. 1A. FIG. 5 is a circuit diagram illustrating a driving circuit 710 of FIG. 4. FIG. 6 is a circuit diagram illustrating a sensing circuit 720 of FIG. 4.

Referring to FIGS. 1A to 6, the touch panel 600 may include a plurality of touch sensors DS1, DS2, DS3, . . . , DSN (see FIG. 4).

The multiplexer MX may include a plurality of transistors TR1, TR2, TR3, . . . , TRN.

For example, a first touch sensor DS1 may be connected to a first transistor TR1, a second touch sensor DS2 may be connected to a second transistor TR2, a third touch sensor DS3 may be connected to a third transistor TR3 and an N-th touch sensor DSN may be connected to an Nth transistor TRN.

The touch driver 700 may be connected to the transistors TR1, TR2, TR3, . . . , TRN. The touch driver 700 may include the driving circuit 710 and the sensing circuit 720.

For example, the driving circuit 710 may output a first touch driving signal (e.g., VS) to first electrodes of the transistors TR1, TR2, TR3, . . . , TRN. For example, the driving circuit 710 may output second touch driving signals (e.g., VG1, VG2, VG3, . . . , VGN) to control (or gate) electrodes of the transistors TR1, TR2, TR3, . . . , TRN.

For example, the driving circuit 710 may include a digital to analog converter. As shown in FIG. 5, the digital to analog converter may include a high power voltage terminal receiving a power voltage VH of a high level and a low power voltage terminal receiving a power voltage VL of a low level and a resistor string R1, R2, R3, . . . , RM-1 and RM disposed between the high power voltage terminal and the low power voltage terminal. The digital to analog converter may include a switch SW1 connected to the high power voltage terminal, a switch SWM+1 connected to the low power voltage terminal and a plurality of switches SW2, SW3, . . . , SWM connected between resistors of the resistor string R1, R2, R3, . . . , RM-1 and RM. When the switches SW1, SW2, SW3, . . . , SWM+1 are sequentially turned on, the digital to analog converter may output the touch driving signal (e.g., VS and VG1, VG2, VG3, . . . , VGN) periodically varying between the power voltage of the high level and the power voltage of the low level.

As shown in FIG. 6, the sensing circuit 720 may include an amplifier AS, a sensing resistor RS, a sensing switch SWS and a sensing capacitor CS. The amplifier AS may include a first input terminal receiving a reference voltage VREF, a second input terminal and an output terminal. The sensing resistor RS may be connected between the second input terminal and the output terminal. The sensing switch SWS may be connected between the second input terminal and the output terminal. The sensing capacitor CS may be connected between the second input terminal and the output terminal.

The sensing resistor RS, the sensing switch SWS and the sensing capacitor CS may be connected to one another in parallel.

The sensing circuit 720 may receive the sensed voltage VSEN of the touch sensors DS1 to DSN through the multiplexer MX.

Figure 7:
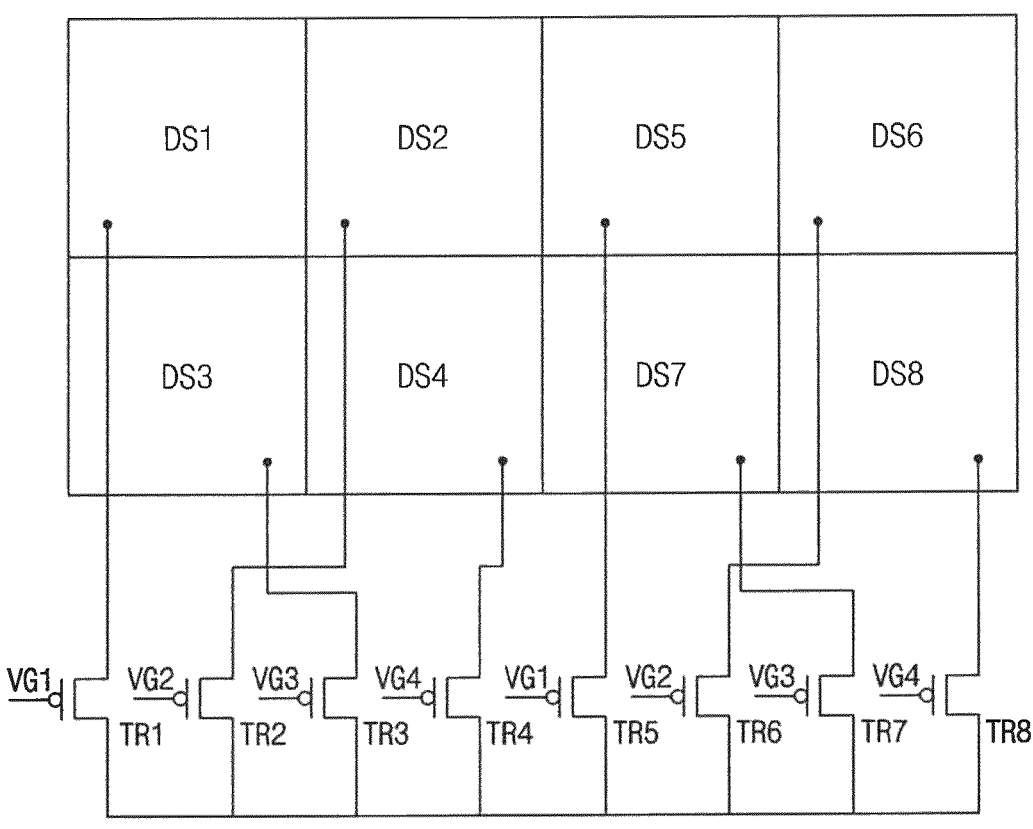
FIG. 7 is a circuit diagram illustrating a part of the touch sensor apparatus of FIG. 1A according to an embodiment of the present inventive concept.
Figure 8:
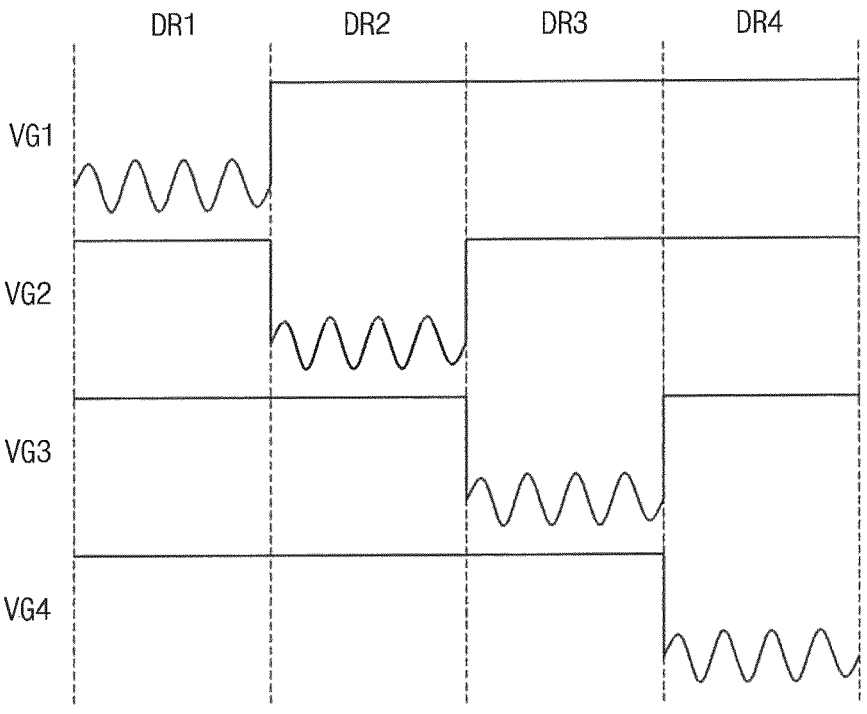
FIG. 8 is a timing diagram illustrating touch driving signals of FIG. 7 according to an embodiment of the present inventive concept.

FIG. 7 is a circuit diagram illustrating a part of the touch sensor apparatus of FIG. 1A according to an embodiment. FIG. 8 is a timing diagram illustrating touch driving signals VG1, VG2, VG3 and VG4 of FIG. 7.

FIG. 7 illustrates eight touch sensors DS1 to DS8 for convenience of explanation. In FIG. 7, the same touch driving signal VG1 is applied to a first touch sensor DS1 and a fifth touch sensor DS5, the same touch driving signal VG2 is applied to a second touch sensor DS2 and a sixth touch sensor DS6, the same touch driving signal VG3 is applied to a third touch sensor DS3 and a seventh touch sensor DS7 and the same touch driving signal VG4 is applied to a fourth touch sensor DS4 and an eighth touch sensor DS8.

In this way, the touch sensors DS1 to DS8 may be driven in a time division driving method using transistors TR1 to TR8 of the multiplexer MX.

As shown in FIG. 7, the touch sensor apparatus may include first to eighth touch sensors DS1 to DS8 and first to eighth transistors TR1 to TR8 corresponding to and connected to the first to eighth touch sensors DS1 to DS8. A first group driving signal VG1 may be applied to a control electrode of the first transistor TR1 and a control electrode of the fifth transistor TR5. A second group driving signal VG2 may be applied to a control electrode of the second transistor TR2 and a control electrode of the sixth transistor TR6. A third group driving signal VG3 may be applied to a control electrode of the third transistor TR3 and a control electrode of the seventh transistor TR7. A fourth group driving signal VG4 may be applied to a control electrode of the fourth transistor TR4 and a control electrode of the eighth transistor TR8.

As shown in FIG. 8, the first group driving signal VG1 has an active waveform, the second group driving signal VG2, the third group driving signal VG3 and the fourth group driving signal VG4 have an inactive level during a first period DR1. For example, the active waveform of the first group driving signal VG1 may have a periodicity or be a periodic signal. For example, the active waveform of the first group driving signal VG1 may be a sine wave, but is not limited thereto.

In FIG. 7, the first to eighth transistors TR1 to TR8 are p-type transistors so that the inactive level of the second group driving signal VG2, the third group driving signal VG3 and the fourth group driving signal VG4 may be a high level. The active waveform of the first group driving signal VG1 may have a voltage lower than the inactive level of the second group driving signal VG2, the third group driving signal VG3 and the fourth group driving signal VG4.

Although the first group driving signal VG1 has a waveform of four cycles during the first period DR1 in FIG. 8 for convenience of explanation, the present inventive concept is not limited thereto. For example, the first group driving signal VG1 may have a waveform of five or more cycles during the first period DR1.

As shown in FIG. 8, the second group driving signal VG2 has an active waveform, the first group driving signal VG1, the third group driving signal VG3 and the fourth group driving signal VG4 have an inactive level (e.g., a constant level) during a second period DR2. The second period DR2 may be subsequent to the first period DR1. For example, the active waveform of the second group driving signal VG2 may have a periodicity or be a periodic signal. For example, the active waveform of the second group driving signal VG2 may be a sine wave but is not limited thereto.

As shown in FIG. 8, the third group driving signal VG3 has an active waveform, the first group driving signal VG1, the second group driving signal VG2 and the fourth group driving signal VG4 have an inactive level during a third period DR3. The third period DR3 may be subsequent to the second period DR2. For example, the active waveform of the third group driving signal VG3 may have a periodicity or be a periodic signal. For example, the active waveform of the third group driving signal VG3 may be a sine wave but is not limited thereto.

As shown in FIG. 8, the fourth group driving signal VG4 has an active waveform, the first group driving signal VG1, the second group driving signal VG2 and the third group driving signal VG3 have an inactive level during a fourth period DR4. The fourth period DR4 may be subsequent to the third period DR3. For example, the active waveform of the fourth group driving signal VG4 may have a periodicity or be a periodic signal. For example, the active waveform of the fourth group driving signal VG4 may be a sine wave but is not limited thereto.

The connection relationship between the touch sensors and the transistors shown in FIG. 7 and the timing and waveform of the touch driving signals shown in FIG. 8 are examples and the present inventive concept is not limited to the connection relationship between the touch sensors and the transistors shown in FIG. 7 and the timing and waveforms of the touch driving signals shown in FIG. 8.

Figure 9:
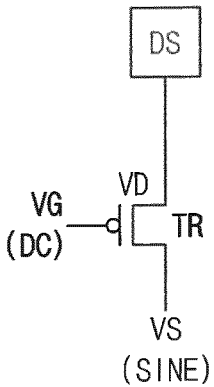
FIG. 9 is a circuit diagram illustrating one touch sensor and one transistor of a touch sensor apparatus according to a comparative embodiment.
Figure 10:
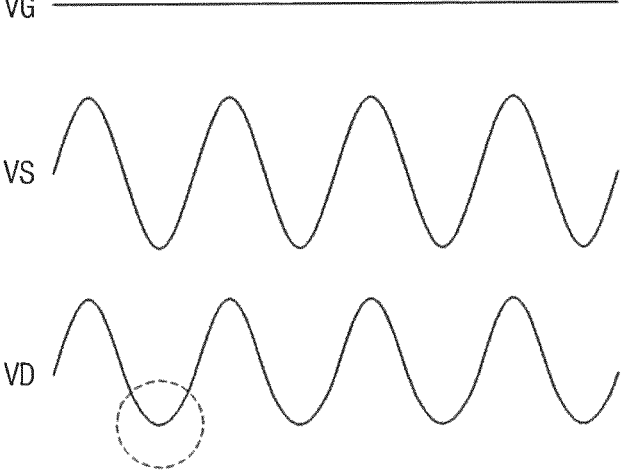
FIG. 10 is a timing diagram illustrating a voltage of a first node of FIG. 9, a voltage of a second node of FIG. 9, a voltage of a third node of FIG. 9.
Figure 11:
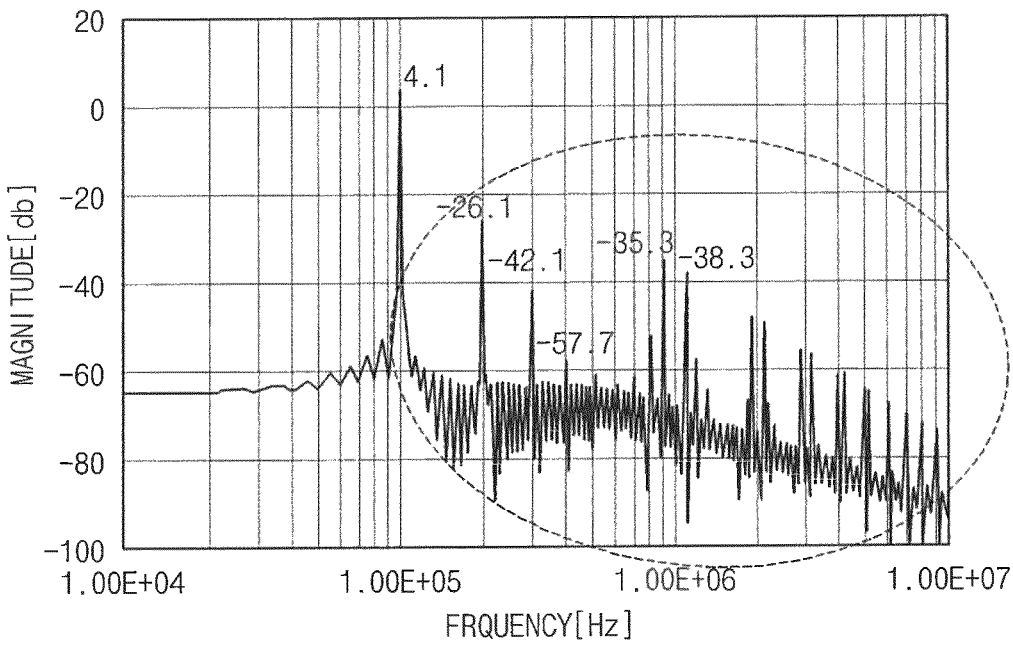
FIG. 11 is a graph illustrating a result of fast Fourier transform of the voltage of the third node of FIG. 10.

FIG. 9 is a circuit diagram illustrating one touch sensor DS and one transistor TR of a touch sensor apparatus according to a comparative embodiment. FIG. 10 is a timing diagram illustrating a voltage VG of a first node of FIG. 9, a voltage VS of a second node of FIG. 9, a voltage VD of a third node of FIG. 9. FIG. 11 is a graph illustrating a result of fast Fourier transform of the voltage VD of the third node of FIG. 10.

Referring to FIGS. 9 to 11, a first node may be a control electrode of the transistor TR and a voltage VG of the first node may be a gate voltage of the transistor TR. A second node may be a first electrode of the transistor TR and a voltage VS of the second node may be a source voltage of the transistor TR. A third node may be a second electrode of the transistor TR and a voltage VD of the third node may be a drain voltage of the transistor TR.

As shown in FIG. 10, the first touch driving signal VS applied to the first electrode of the transistor TR may have a periodicity. The first touch driving signal VS may be a sine wave.

In contrast, the second touch driving signal VG applied to the control electrode of the transistor TR is a direct-current voltage.

In this driving method, a waveform of a Vgs voltage of the transistor TR continues to change along a time axis and a turned-on resistance of the transistor TR also continues to change according to the change of the Vgs voltage.

Accordingly, as shown in FIG. 10, VS may be an undistorted sine wave and VD may be a sine wave having a distorted bottom portion (shown in dotted line).

A result of performing a fast Fourier transform on VD of FIG. 10 is illustrated in FIG. 11. As shown in a dotted line portion of FIG. 11, VD may have harmonic components. The harmonic components may generate unwanted electromagnetic interference (EMI).

Figure 12:
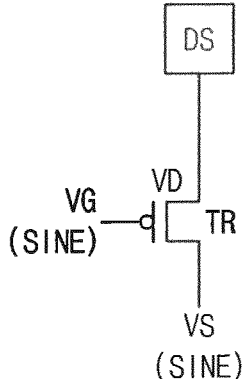
FIG. 12 is a circuit diagram illustrating one touch sensor and one transistor of the touch sensor apparatus of FIG. 4 according to an embodiment of the present inventive concept.
Figure 13:
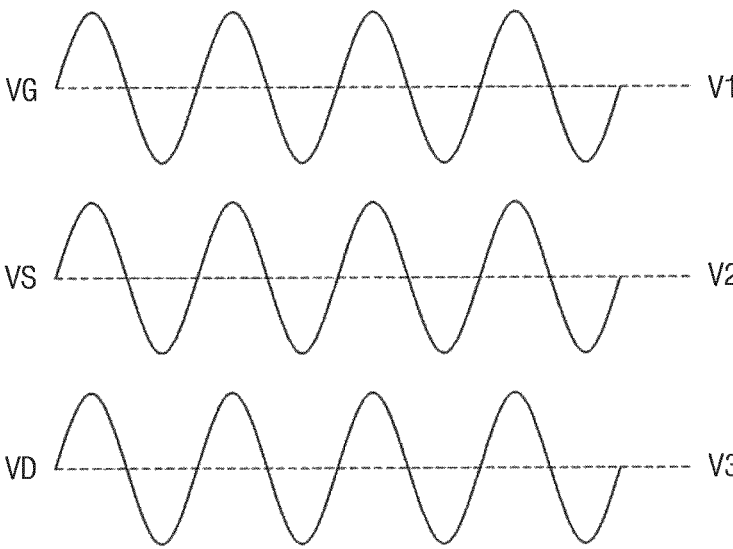
FIG. 13 is a timing diagram illustrating an example of a voltage of a first node of FIG. 12, an example of a voltage of a second node of FIG. 12, an example of a voltage of a third node of FIG. 12.

FIG. 12 is a circuit diagram illustrating one touch sensor DS and one transistor TR of the touch sensor apparatus of FIG. 4. FIG. 13 is a timing diagram illustrating an example of a voltage VG of a first node of FIG. 12, an example of a voltage VS of a second node of FIG. 12, an example of a voltage VD of a third node of FIG. 12.

Referring to FIGS. 12 and 13, a first node may be a control electrode of the transistor TR and a voltage VG of the first node may be a gate voltage of the transistor TR. A second node may be a first electrode of the transistor TR and a voltage VS of the second node may be a source voltage of the transistor TR. A third node may be a second electrode of the transistor TR and a voltage VD of the third node may be a drain voltage of the transistor TR.

In the present embodiment, a phase of the first touch driving signal VS applied to the first electrode of the transistor TR is the same or substantially the same as a phase of the second touch driving signal VG applied to the control electrode of the transistor TR.

An average voltage of the first touch driving signal VS may be different from an average voltage of the second touch driving signal VG.

In an embodiment, an amplitude of the first touch driving signal VS is the same as or substantially the same as an amplitude of the second touch driving signal VG.

In the present embodiment, the transistor TR is a p-type transistor so that the average voltage of the first touch driving signal VS may be greater than the average voltage of the second touch driving signal VG. In an embodiment, the average voltage of the first touch driving signal VS is greater than the average voltage of the second touch driving signal VG so that the transistor TR may be turned on.

For example, the first touch driving signal VS may periodically swing between −5V and 5V with respect to 0V. In contrast, the second touch driving signal VG may periodically swing between −15V and −5V with respect to −10V. Herein, the average voltage of the first touch driving signal VS may be 0V and the average voltage of the second touch driving signal VG may be −10V, but embodiments are not limited thereto.

As shown in FIG. 13, the first touch driving signal VS may have a periodicity or be a periodic signal. The second touch driving signal VG may have a periodicity or be a periodic signal. For example, the first touch driving signal VS may be a sine wave. For example, the second touch driving signal VG may be a sine wave.

In FIG. 13, the average voltage of the second touch driving signal VG is V1 and the average voltage of the first touch driving signal VS is V2. An average voltage of an output voltage VD of the transistor TR is V3.

A method of driving the touch sensor DS of the present embodiment includes applying the first touch driving signal VS to the first electrode of the transistor TR including the second electrode connected to the touch sensor DS, applying the second touch driving signal VG to the control electrode of the transistor TR and receiving a sensed voltage VSEN of the touch sensor DS through the transistor TR.

In the driving method of the present embodiment, the sine wave applied to the touch sensor DS may not be distorted. In the present embodiment, a phase of the first touch driving signal VS applied to a source electrode of the transistor TR is the same as or substantially the same as a phase of the second touch driving signal VG applied to a gate electrode of the transistor TR.

Accordingly, a waveform of a Vgs of the transistor TR may be maintained uniformly so that a turned-on resistance of the transistor TR may be maintained uniformly. Therefore, the sine wave may not be distorted so that a harmonic frequency signal, which is a characteristic of the sine wave, may be reduced or removed.

Figure 14:
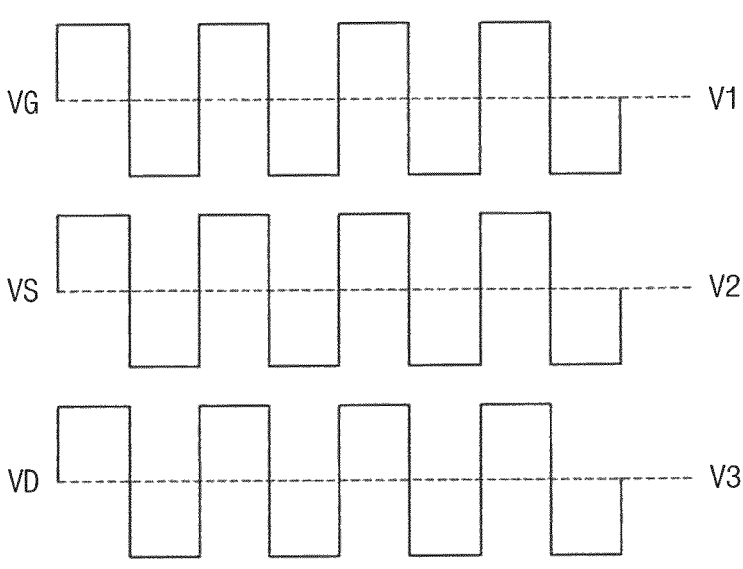
FIG. 14 is a timing diagram illustrating an example of a voltage of a first node of FIG. 12, an example of a voltage of a second node of FIG. 12, an example of a voltage of a third node of FIG. 12.

FIG. 14 is a timing diagram illustrating an example of a voltage VG of a first node of FIG. 12, an example of a voltage VS of a second node of FIG. 12, an example of a voltage VD of a third node of FIG. 12.

Referring to FIGS. 12 and 14, in the present embodiment, a phase of the first touch driving signal VS applied to the first electrode of the transistor TR is the same or substantially the same as a phase of the second touch driving signal VG applied to the control electrode of the transistor TR.

In an embodiment, an average voltage of the first touch driving signal VS is different from an average voltage of the second touch driving signal VG.

In an embodiment, an amplitude of the first touch driving signal VS is the same as or substantially the same as an amplitude of the second touch driving signal VG.

In the present embodiment, the transistor TR is a p-type transistor so that the average voltage of the first touch driving signal VS may be greater than the average voltage of the second touch driving signal VG. In an embodiment, the average voltage of the first touch driving signal VS is greater than the average voltage of the second touch driving signal VG so that the transistor TR may be turned on.

As shown in FIG. 14, the first touch driving signal VS may have a periodicity or be a periodic signal. The second touch driving signal VG may have a periodicity or be a periodic signal. For example, the first touch driving signal VS may be a square wave. For example, the second touch driving signal VG may be a square wave.

In FIG. 13, the average voltage of the first touch driving signal VS may be V2 and the average voltage of the second touch driving signal VG may be V1. An average voltage of an output voltage VD of the transistor TR may be V3.

Figure 15:
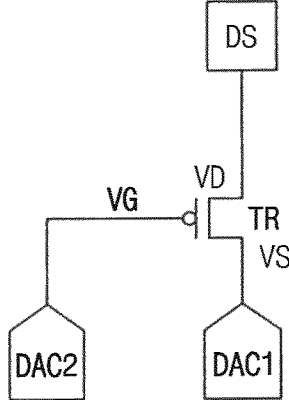
FIG. 15 is a circuit diagram illustrating one touch sensor and one transistor of FIG. 4, a first touch driving signal generator and a second touch driving signal generator according to an embodiment of the present inventive concept.
Figure 16:
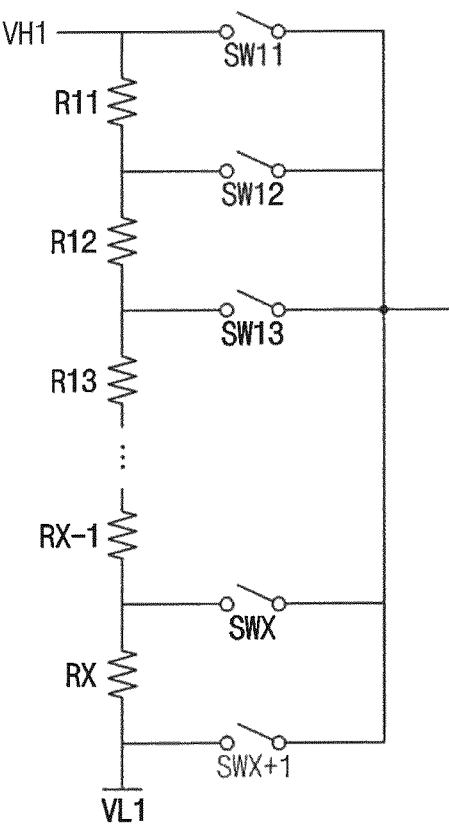
FIG. 16 is a circuit diagram illustrating the first touch driving signal generator according to an embodiment of the present inventive concept.
Figure 17:
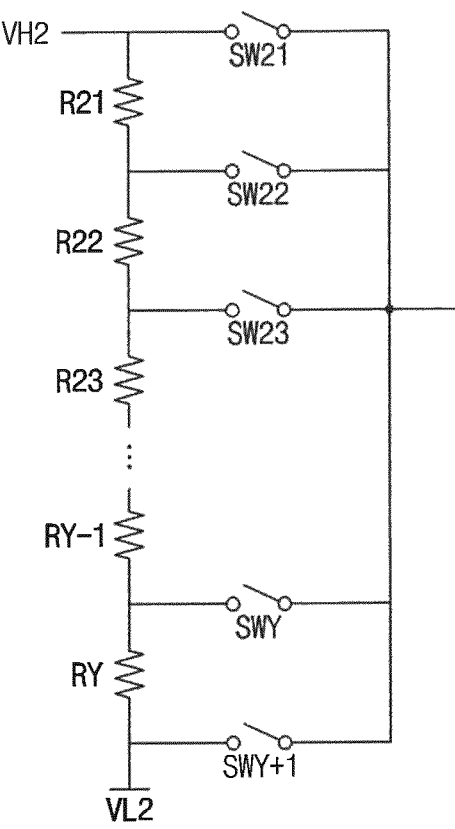
FIG. 17 is a circuit diagram illustrating the second touch driving signal generator according to an embodiment of the present inventive concept.

FIG. 15 is a circuit diagram illustrating one touch sensor DS and one transistor TR of FIG. 4, a first touch driving signal generator DAC1 and a second touch driving signal generator DAC2. FIG. 16 is a circuit diagram illustrating the first touch driving signal generator DAC1 according to an embodiment. FIG. 17 is a circuit diagram illustrating the second touch driving signal generator DAC2 to an embodiment.

Referring to FIGS. 1A to 8 and 12 to 17, the touch sensor apparatus may further include a first touch driving signal generator DAC1 generating the first touch driving signal VS and a second touch driving signal generator DAC2 generating the second touch driving signal VG.

In the present embodiment, the first touch driving signal generator DAC1 may be a first digital to analog converter and the second touch driving signal generator DAC2 may be a second digital to analog converter.

As shown in FIG. 16, the first digital to analog converter may include a first power voltage terminal receiving a first power voltage VH1, a second power voltage terminal receiving a second power voltage VL1, a plurality of first converter resistors R11 to RX connected between the first power voltage terminal and the second power voltage terminal and a plurality of first converter switches SW11 to SWX+1 connected to the first power voltage terminal, the second power voltage terminal and nodes between the first converter resistors R11 to RX.

As shown in FIG. 17, the second digital to analog converter may include a third power voltage terminal receiving a third power voltage VH2, a fourth power voltage terminal receiving a fourth power voltage VL2, a plurality of second converter resistors R21 to RY connected between the third power voltage terminal and the fourth power voltage terminal and a plurality of second converter switches SW21 to SWY+1 connected to the third power voltage terminal, the fourth power voltage terminal and nodes between the second converter resistors R21 to RY.

In an embodiment of the present inventive concept, the first power voltage VH1 is different from the third power voltage VH2; and the second power voltage VL1 is different from the fourth power voltage VL2.

In the present embodiment, the transistor TR is a p-type transistor so that the third power voltage VH2 may be less than the first power voltage VH1 and the fourth power voltage VL2 may be less than the second power voltage VL1.

For example, when the first touch driving signal VS periodically swings between −5V and 5V with respect to 0V and the second touch driving signal VG periodically swings between −15V and −5V with respect to −10V, the first power voltage VH1 may be 5V, the second power voltage VL1 may be −5V, the third power voltage VH2 may be −5V and the fourth power voltage VL2 may be −15V.

According to the present embodiment, the first touch driving signal VS applied to the first electrode of the transistor TR, which is connected to the touch sensor DS, and the second touch driving signal VG applied to the control electrode of the transistor TR are generated to have the same phase so that EMI may be reduced.

Accordingly, the display quality of the display panel 100 may be enhanced and an influence of the EMI on the touch sensor apparatus and the electronic devices adjacent to the touch sensor apparatus may be reduced. In particular, when the display apparatus is used in a horizontally long display such as for a vehicle, the safety of the vehicle may be enhanced by reducing the EMI.

Figure 18:
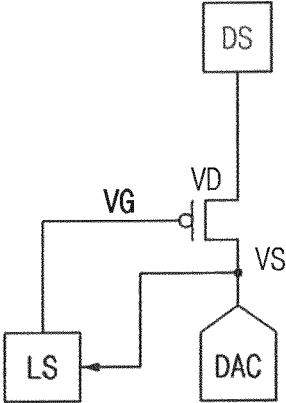
FIG. 18 is a circuit diagram illustrating one touch sensor, one transistor, a first touch driving signal generator and a second touch driving signal generator of a touch sensor apparatus according to an embodiment of the present inventive concept.

FIG. 18 is a circuit diagram illustrating one touch sensor DS, one transistor TR, a first touch driving signal generator DAC and a second touch driving signal generator LS of a touch sensor apparatus according to an embodiment of the present inventive concept.

The touch sensor apparatus and the display apparatus according to the present embodiment are substantially the same as the touch sensor apparatus and the display apparatus of the previous embodiment explained referring to FIGS. 1A to 17 except for the structure and the operation of the second touch driving signal generator. Thus, the same reference numerals will be used to refer to the same or like parts as those described in the previous embodiment of FIGS. 1A to 17 and any repetitive explanation concerning the above elements will be omitted.

Referring to FIGS. 1A to 8, 12 to 14 and 16 to 18, the display apparatus includes a display panel 100, a display panel driver driving the display panel 100, a touch panel 600 disposed on the display panel 100 and a touch driver 700 driving the touch panel 600.

The touch panel 600 includes a touch sensor DS. For example, the touch sensor DS may be a self dot sensor.

A plurality of touch sensors DS may be connected to a multiplexer MX. The multiplexer MX may select a specific touch sensor DS at a specific time to drive the touch sensors DS in a time division driving method. The multiplexer MX may include a plurality of transistors connected to the plurality of touch sensors DS.

For example, the multiplexer MX may be disposed in a peripheral region PA of the display panel 100. For example, the transistors of the multiplexer MX may be disposed in the peripheral region PA of the display panel 100. For example, the transistors may be integrated on the peripheral region PA of the display panel 100.

The touch driver 700 may apply a touch driving signal to the transistor. The touch driver 700 may receive a sensed voltage of the touch sensor DS through the transistor.

In the present embodiment, a phase of the first touch driving signal VS applied to the first electrode of the transistor TR is the same as or substantially the same as a phase of the second touch driving signal VG applied to the control electrode of the transistor TR.

In an embodiment, an average voltage of the first touch driving signal VS is different from an average voltage of the second touch driving signal VG.

In an embodiment, an amplitude of the first touch driving signal VS is the same or substantially the same as an amplitude of the second touch driving signal VG.

In the present embodiment, the transistor TR is a p-type transistor so that the average voltage of the first touch driving signal VS may be greater than the average voltage of the second touch driving signal VG. In an embodiment, the average voltage of the first touch driving signal VS is greater than the average voltage of the second touch driving signal VG so that the transistor TR may be turned on.

The touch sensor apparatus may further include a first touch driving signal generator DAC generating the first touch driving signal VS and a second touch driving signal generator LS generating the second touch driving signal VG.

In the present embodiment, the first touch driving signal generator DAC is a first digital to analog converter and the second touch driving signal generator LS is a level shifter (e.g., a level shifter circuit).

As shown in FIG. 16, the first digital to analog converter may include a first power voltage terminal receiving a first power voltage VH1, a second power voltage terminal receiving a second power voltage VL1, a plurality of first converter resistors R11 to RX connected between the first power voltage terminal and the second power voltage terminal and a plurality of first converter switches SW11 to SWX+1 connected to the first power voltage terminal, the second power voltage terminal and nodes between the first converter resistors R11 to RX.

In an embodiment, the level shifter receives the first touch driving signal VS output from the first digital analog converter and shifts a level of the first touch driving signal VS to generate the second touch driving signal VG. The level shifter does not change a phase of the first touch driving signal VS but a level of the first touch driving signal VS to generate the second touch driving signal VG. Thus, the first touch driving signal VS and the second touch driving signal VG may have the same phase.

According to the present embodiment, the first touch driving signal VS applied to the first electrode of the transistor TR, which is connected to the touch sensor DS, and the second touch driving signal VG applied to the control electrode of the transistor TR are generated to have the same phase so that EMI may be reduced.

Accordingly, the display quality of the display panel 100 may be enhanced and an influence of the EMI on the touch sensor apparatus and the electronic devices adjacent to the touch sensor apparatus may be reduced. In particular, when the display apparatus is used in a horizontally long display such as for a vehicle, the safety of the vehicle may be enhanced by reducing the EMI.

Figure 19:
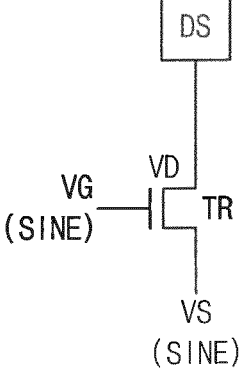
FIG. 19 is a circuit diagram illustrating one touch sensor and one transistor according to an embodiment of the present inventive concept.
Figure 20:
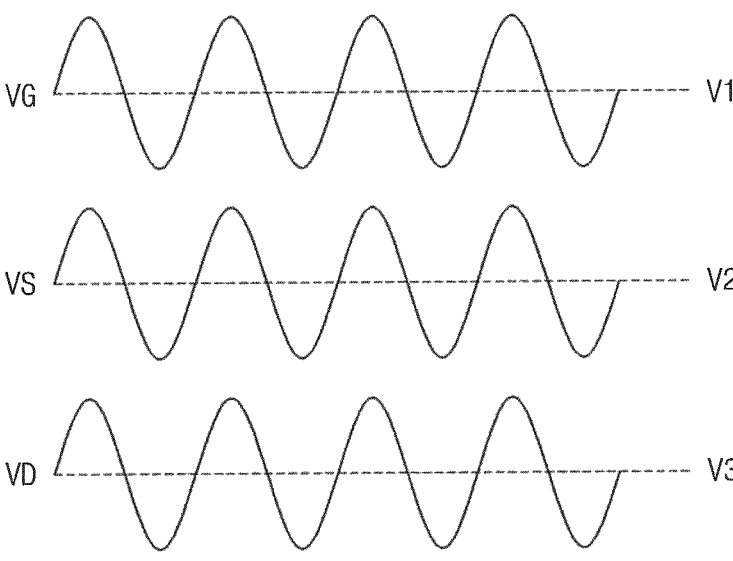
FIG. 20 is a timing diagram illustrating an example of a voltage of a first node of FIG. 19, an example of a voltage of a second node of FIG. 19, an example of a voltage of a third node of FIG. 19.

FIG. 19 is a circuit diagram illustrating one touch sensor and one transistor according to an embodiment of the present inventive concept. FIG. 20 is a timing diagram illustrating an example of a voltage of a first node of FIG. 19, an example of a voltage of a second node of FIG. 19, an example of a voltage of a third node of FIG. 19.

The touch sensor apparatus and the display apparatus according to the present embodiment are substantially the same as the touch sensor apparatus and the display apparatus of the previous embodiment explained referring to FIGS. 1A to 17 except that the transistor of the multiplexer is an n-type transistor. Thus, the same reference numerals will be used to refer to the same or like parts as those described in the previous embodiment of FIGS. 1A to 17 and any repetitive explanation concerning the above elements will be omitted.

Referring to FIGS. 1A to 8, and 19 to 20, the display apparatus includes a display panel 100, a display panel driver driving the display panel 100, a touch panel 600 disposed on the display panel 100 and a touch driver 700 driving the touch panel 600.

The touch panel 600 includes a touch sensor DS. For example, the touch sensor DS may be a self dot sensor.

A plurality of touch sensors DS may be connected to a multiplexer MX. The multiplexer MX may select a specific touch sensor DS at a specific time to drive the touch sensors DS in a time division driving method. The multiplexer MX may include a plurality of transistors connected to the plurality of touch sensors DS.

For example, the multiplexer MX may be disposed in a peripheral region PA of the display panel 100. For example, the transistors TR of the multiplexer MX may be disposed in the peripheral region PA of the display panel 100. For example, the transistors TR may be integrated on the peripheral region PA of the display panel 100.

The touch driver 700 may apply a touch driving signal to the transistor. The touch driver 700 may receive a sensed voltage of the touch sensor DS through the transistor TR.

In the present embodiment, a phase of the first touch driving signal VS applied to the first electrode of the transistor TR is the same or substantially the same as a phase of the second touch driving signal VG applied to the control electrode of the transistor TR.

In an embodiment, an average voltage of the first touch driving signal VS is different from an average voltage of the second touch driving signal VG.

In an embodiment, an amplitude of the first touch driving signal VS may be substantially the same as an amplitude of the second touch driving signal VG.

In the present embodiment, the transistor TR is an n-type transistor so that the average voltage of the first touch driving signal VS may be less than the average voltage of the second touch driving signal VG. In an embodiment, the average voltage of the first touch driving signal VS is less than the average voltage of the second touch driving signal VG so that the transistor TR may be turned on.

As shown in FIG. 20, the first touch driving signal VS may have a periodicity or be a periodic signal. The second touch driving signal VG may have a periodicity or be a periodic signal. For example, the first touch driving signal VS may be a sine wave. For example, the second touch driving signal VG may be a sine wave.

In FIG. 20, the average voltage of the first touch driving signal VG may be V1 and the average voltage of the first touch driving signal VG may be V1. An average voltage of an output voltage VD of the transistor TR may be V3.

Alternatively, as shown in FIG. 14, the first touch driving signal VS may be a square wave and the second touch driving signal VG may be a square wave.

The touch sensor apparatus of the present embodiment may include a first touch driving signal generator DAC1 which is a first digital analog converter and a second touch driving signal generator DAC2 which is a second digital analog converter as shown in FIG. 15.

Alternatively, the touch sensor apparatus of the present embodiment may include a first touch driving signal generator DAC which is a first digital analog converter and a second touch driving signal generator LS which is a level shifter as shown in FIG. 18.

According to the present embodiment, the first touch driving signal VS applied to the first electrode of the transistor TR, which is connected to the touch sensor DS, and the second touch driving signal VG applied to the control electrode of the transistor TR may be generated to have the same phase so that EMI may be reduced.

Accordingly, the display quality of the display panel 100 may be enhanced and an influence of the EMI on the touch sensor apparatus and the electronic devices adjacent to the touch sensor apparatus may be reduced. In particular, when the display apparatus is used in a horizontally long display such as for a vehicle, the safety of the vehicle may be enhanced by reducing the EMI.

Figure 21:
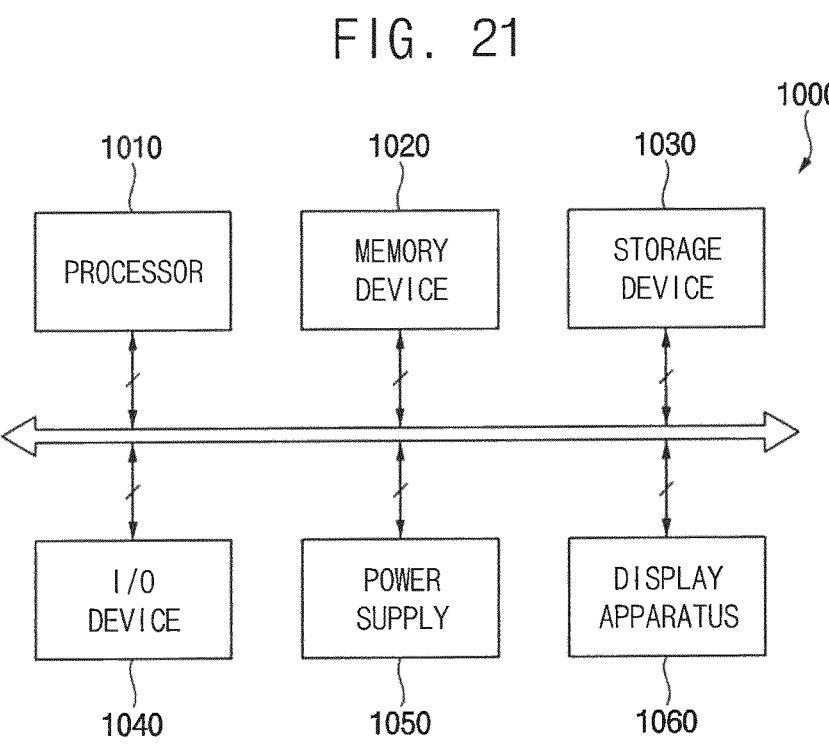
FIG. 21 is a block diagram illustrating an electronic apparatus according to an embodiment of the present inventive concept.
Figure 22:
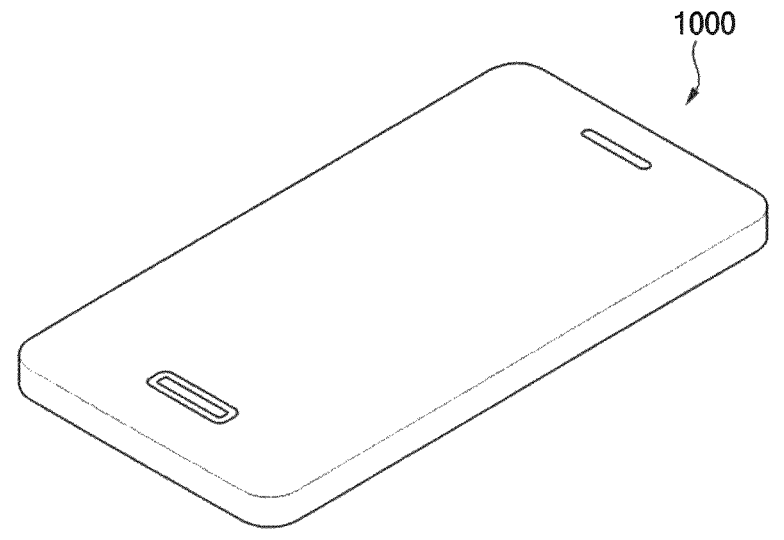
FIG. 22 is a diagram illustrating an example in which the electronic apparatus of FIG. 21 is implemented as a smart phone.

FIG. 21 is a block diagram illustrating an electronic apparatus according to an embodiment of the present inventive concept. FIG. 22 is a diagram illustrating an example in which the electronic apparatus of FIG. 21 is implemented as a smart phone.

Referring to FIGS. 21 and 22, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1A. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 22, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 2.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Although the electronic apparatus of the present inventive concept is implemented as a smart phone in FIG. 22, the present inventive concept is not limited thereto. Alternatively, the electronic apparatus may be one of a television, a monitor, a laptop or a tablet personal computer (PC). Alternatively, the electronic apparatus may be a car.

According to the embodiments of the touch sensor apparatus, the display apparatus including the touch sensor apparatus and a method of driving the touch sensor using the touch sensor apparatus, the first touch driving signal applied to the first electrode of the transistor, which is connected to the touch sensor, and the second touch driving signal applied to the control electrode of the transistor may be generated to have the same phase so that EMI may be reduced. When the display apparatus is used in a horizontally long display such as for a vehicle, the safety of the vehicle may be enhanced by reducing the EMI.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the present inventive concept. Accordingly, all such modifications are intended to be included within the scope of the present inventive concept as defined in the claims.

What is claimed is:

1. A touch sensor apparatus comprising:
a touch sensor; and
a transistor connected to the touch sensor,
wherein the transistor comprises:
a first electrode configured to receive a first touch driving signal;

a control electrode configured to receive a second touch driving signal; and
a second electrode connected to the touch sensor,
wherein a phase of the first touch driving signal is substantially the same as a phase of the second touch driving signal, and
wherein an average voltage of the first touch driving signal is different from an average voltage of the second touch driving signal.

2. The touch sensor apparatus of claim 1, wherein the first touch driving signal includes a sine wave, and
wherein the second touch driving signal includes a sine wave.

3. The touch sensor apparatus of claim 1, wherein the first touch driving signal includes a square wave, and
wherein the second touch driving signal includes a square wave.

4. The touch sensor apparatus of claim 1, wherein when the transistor is a p-type transistor, the average voltage of the first touch driving signal is greater than the average voltage of the second touch driving signal.

5. The touch sensor apparatus of claim 1, wherein when the transistor is an n-type transistor, the average voltage of the first touch driving signal is less than the average voltage of the second touch driving signal.

6. The touch sensor apparatus of claim 1, further comprising:
a first digital to analog converter configured to generate the first touch driving signal; and
a second digital to analog converter configured to generate the second touch driving signal.

7. The touch sensor apparatus of claim 6, wherein the first digital to analog converter comprises:
a first power voltage terminal configured to receive a first power voltage;
a second power voltage terminal configured to receive a second power voltage;
a plurality of first resistors connected between the first power voltage terminal and the second power voltage terminal; and
a plurality of first switches connected to the first power voltage terminal, the second power voltage terminal and nodes between the first resistors, and
wherein the second digital to analog converter comprises:
a third power voltage terminal configured to receive a third power voltage;
a fourth power voltage terminal configured to receive a fourth power voltage;
a plurality of second resistors connected between the third power voltage terminal and the fourth power voltage terminal; and
a plurality of second switches connected to the third power voltage terminal, the fourth power voltage terminal and nodes between the second resistors.

8. The touch sensor apparatus of claim 7, wherein the first power voltage is different from the third power voltage, and
wherein the second power voltage is different from the fourth power voltage.

9. The touch sensor apparatus of claim 1, further comprising:
a digital to analog converter configured to generate the first touch driving signal; and
a level shifter configured to generate the second touch driving signal.

10. The touch sensor apparatus of claim 9, wherein the digital to analog converter comprises:

a first power voltage terminal configured to receive a first power voltage;

a second power voltage terminal configured to receive a second power voltage;

a plurality of first resistors connected between the first power voltage terminal and the second power voltage terminal; and a plurality of first switches connected to the first power voltage terminal, the second power voltage terminal and nodes between the first resistors.

11. The touch sensor apparatus of claim 9, wherein the level shifter is configured to receive the first touch driving signal output from the digital to analog converter and shift a level of the first touch driving signal to generate the second touch driving signal.

12. The touch sensor apparatus of claim 1, further comprising a touch driver, wherein the touch driver comprises:

a driving circuit configured to apply the first touch driving signal and the second touch driving signal to the transistor; and a sensing circuit configured to receive a sensed voltage from the transistor.

13. The touch sensor apparatus of claim 12, wherein the sensing circuit comprises:

an amplifier including a first input terminal configured to receive a reference voltage, a second input terminal and an output terminal;

a resistor connected between the second input terminal and the output terminal;

a switch connected between the second input terminal and the output terminal; and a capacitor connected between the second input terminal and the output terminal.

14. The touch sensor apparatus of claim 1, wherein the touch sensor apparatus comprises:

first to eighth touch sensors; and first to eighth transistors each connected to a corresponding one of the first to eighth touch sensors, wherein a first group driving signal is configured to be applied to a control electrode of the first transistor and a control electrode of the fifth transistor, wherein a second group driving signal is configured to be applied to a control electrode of the second transistor and a control electrode of the sixth transistor, wherein a third group driving signal is configured to be applied to a control electrode of the third transistor and a control electrode of the seventh transistor, and wherein a fourth group driving signal is configured to be applied to a control electrode of the fourth transistor and a control electrode of the eighth transistor.

15. The touch sensor apparatus of claim 14, wherein the first group driving signal has an active waveform, the second group driving signal, the third group driving signal and the fourth group driving signal have an inactive level during a first period, wherein the second group driving signal has an active waveform, the first group driving signal, the third group driving signal and the fourth group driving signal have an inactive level during a second period, wherein the third group driving signal has an active waveform, the first group driving signal, the second group driving signal and the fourth group driving signal have an inactive level during a third period, and wherein the fourth group driving signal has an active waveform, the first group driving signal, the second group driving signal and the third group driving signal have an inactive level during a fourth period.

16. An electronic device comprising:

a display apparatus comprising:

a display panel comprising a display region including a plurality of pixels;

a display panel driver configured to drive the display panel;

a touch sensor; and a transistor connected to the touch sensor, wherein the transistor comprises:

a first electrode configured to receive a first touch driving signal;

a control electrode configured to receive a second touch driving signal; and a second electrode connected to the touch sensor, wherein a phase of the first touch driving signal is substantially the same as a phase of the second touch driving signal, and wherein the transistor connected to the touch sensor is disposed outside a boundary of the display region of the display panel.

17. The electronic device of claim 16, wherein the second electrode is connected directly to the touch sensor.

18. The electronic device of claim 16, wherein an average voltage of the first touch driving signal is different from an average voltage of the second touch driving signal.

19. A method of driving a touch sensor, the method comprising:

applying a first touch driving signal to a first electrode of a transistor including a second electrode connected to the touch sensor;

applying a second touch driving signal to a control electrode of the transistor;

receiving a sensed voltage of the touch sensor through the transistor; and providing, by a multiplexer that includes the transistor, the sensed voltage at a specific time to a sensing circuit, wherein a phase of the first touch driving signal is substantially the same as a phase of the second touch driving signal.

20. The method of claim 19, wherein an average voltage of the first touch driving signal is different from an average voltage of the second touch driving signal.

* * * * *